(12) United States Patent
Fukuhara et al.

(10) Patent No.: US 9,781,282 B2
(45) Date of Patent: Oct. 3, 2017

(54) OPTICAL SCANNING DEVICE (71) Applicant: CANON KABUSHIKI KAISHA, Tokyo (JP)

(72) Inventors: Hiroyuki Fukuhara, Suntou-gun (JP); Tetsuya Nishiguchi, Tagata-gun (JP); Isshin Sato, Suntou-gun (JP); Mitsuhiro Obara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/175,490

(22) Filed: Jun. 7, 2016

(65) Prior Publication Data

US 2016/0373598 A1    Dec. 22, 2016

(30) Foreign Application Priority Data

Jun. 16, 2015  (JP) ................................ 2015-121297
May 13, 2016  (JP) ................................ 2016-097161

(51) Int. Cl.
| | |
|---|---|
| *H04N 1/00* | (2006.01) |
| *H04N 1/04* | (2006.01) |
| *G03G 15/04* | (2006.01) |
| *G03G 21/16* | (2006.01) |
| *G02B 26/12* | (2006.01) |

(52) U.S. Cl.
CPC ..... *H04N 1/00551* (2013.01); *G03G 15/0409* (2013.01); *G03G 21/1666* (2013.01); *H04N 1/04* (2013.01); *G02B 26/12* (2013.01); *H04N 2201/0081* (2013.01)

(58) Field of Classification Search
CPC combination set(s) only.
See application file for complete search history.

(56) References Cited

U.S. PATENT DOCUMENTS

| | | | |
|---|---|---|---|
| 2007/0134003 A1* | 6/2007 | Lee ...................... | G02B 6/4201 398/164 |
| 2007/0211136 A1* | 9/2007 | Hori ....................... | H04N 1/032 347/238 |
| 2014/0158874 A1* | 6/2014 | Kusuda .................. | G02B 26/10 250/234 |

FOREIGN PATENT DOCUMENTS

| | | |
|---|---|---|
| JP | 2000235159 A | 8/2000 |
| JP | 2002072114 A | 3/2002 |
| JP | 2004279611 A | 10/2004 |
| JP | 2008012690 A | 1/2008 |

* cited by examiner

*Primary Examiner* — Clayton E Laballe
*Assistant Examiner* — Jas Sanghera
(74) *Attorney, Agent, or Firm* — Canon U.S.A., Inc. IP Division

(57) ABSTRACT

The present invention roughens at least a partial region of an outer planar surface of at least one of an optical case and a lid of a laser scanner; thus, electrification of the optical case to be caused by friction with another member or a person is reduced, and damage to an electronic component is prevented.

20 Claims, 13 Drawing Sheets

OPTICAL SCANNING DEVICE

BACKGROUND OF THE INVENTION

Field of the Invention

The present invention relates to an optical scanning device that scans a target surface with a laser beam.

Description of the Related Art

An optical scanning device used in an image forming apparatus of an electrophotographic recording type, such as a laser printer, deflects a laser beam emitted by a light source with an optical deflector and scans a photosensitive member in accordance with an image signal. Typically, an optical scanning device includes an electronic component, such as a laser driver for driving a light source or a motor driver for driving an optical deflector, and the electronic component is covered by a case and a lid for the optical scanning device. In addition, in order to reduce the cost, a case or a lid is typically fabricated by shaping resin with a mold. A case or a lid needs to be dimensioned with high precision. Therefore, when resin is molded, the surface roughness of the mold is reduced in order to increase the flowability or the releasability of resin, and thus the precision of the component is improved. Since the surface roughness of the mold is low, the surface roughness of the molded product is also low, and the molded product may be glossy depending on the material.

Japanese Patent Laid-Open No. 2004-279611 discloses a configuration in which the inner surface of the case is roughened so that a deflected and scanned laser beam is not reflected by the inner surface of the case.

In the meantime, when dust or the like enters the interior of an optical scanning device, the dust may block a laser beam, which leads to a problem in that a portion corresponding to the blocked laser beam is missing in an image. Therefore, when transporting an optical scanning device that is to be embedded into an image forming apparatus, the optical scanning device is transported while being covered tightly or individually packaged in a bag in order to prevent dust from entering the optical scanning device.

However, a case or a lid constituting the optical scanning device can be electrified as an assembly operator comes into contact with the optical scanning device while embedding the optical scanning device into the image forming apparatus. As a result, an electrostatic discharge (ESD) may occur in an IC, such as a laser driver, a motor driver, or a BD sensor, and the IC can be damaged. In addition, there is a mode in which static electricity flows from a charged case or lid when connecting a cable for a motor or a laser and a driver IC for the motor or the laser is damaged. Furthermore, in a case in which an optical scanning device is individually packaged, electrification by peeling may occur between the bag and the case or the id when removing the optical scanning device from the bag, and a driver IC for a motor or a laser can be damaged in a similar manner. Typically, a countermeasure is taken by carrying out a de-electrification operation with the use of an ionizer or the like, but it takes time to carry out de-electrification in a stable manner. In addition, although the surface potential can be reduced, the potential of the interior of the case that is not exposed to the de-electrifying air cannot be reduced, and thus such a countermeasure has little effect on the ESD when the aforementioned cable is connected.

SUMMARY OF THE INVENTION

The present invention provides an optical scanning device that includes an electronic component prone to damage from an electrostatic discharge but that can withstand various ESD modes.

Another aspect of the present invention provides an optical scanning device that includes a laser light source; a first substrate provided with an electronic component for driving the laser light source; an optical deflector configured to deflect and scan a light beam emitted by the laser light source; a second substrate provided with an electronic component for driving the optical deflector; a case made of resin and configured to house the optical deflector; and a lid made of resin and configured to cover an opening of the case, wherein at least a partial region of an outer planar surface of at least one of the case and the lid is roughened.

A yet another aspect of the present invention provides an optical scanning device that includes a laser light source; an optical deflector configured to deflect and scan a light beam emitted by the laser light source; a case made of resin and configured to house the optical deflector; and a lid made of resin and configured to cover an opening of the case, wherein a display portion configured to display information related to the light beam, a first rough surface region provided around the display portion, and a smooth region provided between the display portion and the first rough surface region are provided on a surface of the lid, the display portion, the first rough surface region, and the smooth region being formed integrally with the lid, and wherein a letter and a symbol indicating the information related to the light beam and a second rough surface region are provided in the display portion.

A yet another aspect of the present invention provides an optical scanning device that includes a laser light source; an optical deflector configured to deflect and scan a light beam emitted by the laser light source; a case made of resin and configured to house the optical deflector; and a lid made of resin and configured to cover an opening of the case, wherein a display portion configured to display information related to the light beam, a first rough surface region provided around the display portion, and one of a rib and a groove provided between the display portion and the first rough surface region are provided on a surface of the lid, the display portion, the first rough surface region, and one of the rib and the groove being formed integrally with the lid, and wherein a letter and a symbol indicating the information related to the light beam and a second rough surface region are provided in the display portion.

A yet another aspect of the present invention provides an optical scanning device that includes a laser light source; an optical deflector configured to deflect and scan a light beam emitted by the laser light source; a case made of resin and configured to house the optical deflector; and a lid made of resin and configured to cover an opening of the case, wherein a display portion configured to display information related to the light beam and a first rough surface region provided around the display portion are provided on a surface of the lid, the display portion and the first rough surface region being formed integrally with the lid, wherein a letter and a symbol indicating the information related to the light beam and a second rough surface region are provided in the display portion, and wherein the display portion and the first rough surface region differ in height.

Further features of the present invention will become apparent from the following description of exemplary embodiments with reference to the attached drawings.

DESCRIPTION OF THE EMBODIMENTS

First Exemplary Embodiment

Hereinafter, an exemplary embodiment of the present invention will be described. It is to be noted that the dimensions, the materials, and the shapes of constituent elements described in the following exemplary embodiments and the relative arrangement of such constituent elements are not to limit the scope of the present invention thereto, unless otherwise indicated in specific terms.

Figure 1:
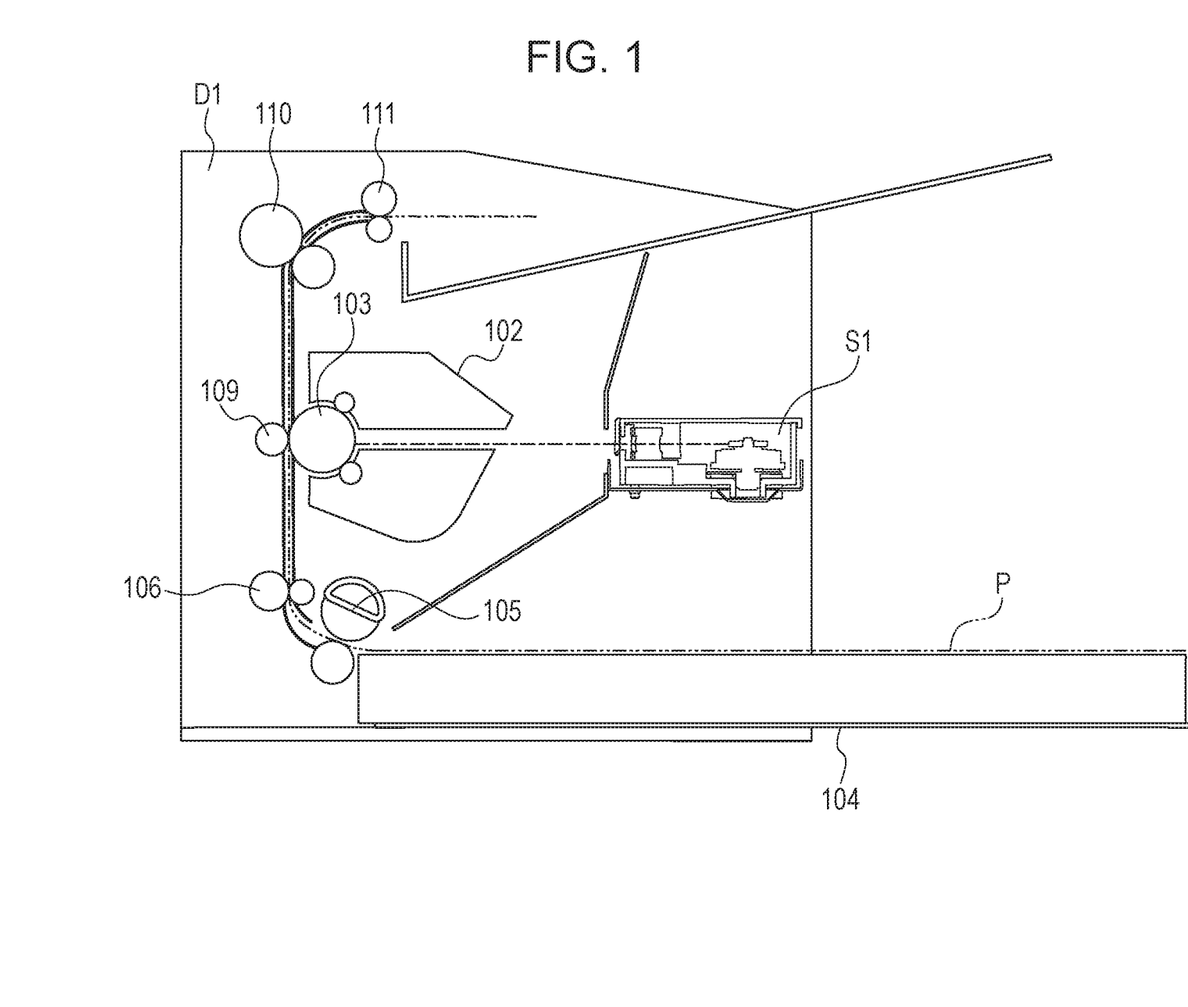
FIG. 1 is a sectional view of an image forming apparatus.

FIG. 1 is a schematic sectional view of an image forming apparatus D1. The image forming apparatus D1 includes an optical scanning device S1. The image forming apparatus D1 scans an image carrying member, such as a photosensitive drum, by the optical scanning device S1 and forms an image on a recording material P, such as recording paper, on the basis of the scanned image. As illustrated in FIG. 1, the image forming apparatus D1 emits a laser beam from the optical scanning device S1 on the basis of image information and irradiates, with the laser beam, a photosensitive drum 103 serving as an image carrying member embedded in a process cartridge 102. As the photosensitive drum 103 is irradiated with the light beam and exposed, a latent image is formed on the photosensitive drum 103. The latent image formed on the photosensitive drum is visualized into a toner image by toner. It is to be noted that the process cartridge 102 includes the photosensitive drum 103 integrated with a charging unit and a developing unit, serving as a process unit that acts on the photosensitive drum 103. Meanwhile, the recording material P stored in a feed cassette 104 is fed one by one while being separated by the feed roller 105 and conveyed further to the downstream side by a conveyance roller 106. The toner image formed on the photosensitive drum 103 is transferred onto the recording material P by a transfer roller 109. The recording material P on which the toner image has been formed is conveyed further to the downstream side, and the toner image is thermally fixed to the recording material P by a fixing device 110 that includes a heater thereinside. Thereafter, the recording material P is discharged to the outside by a discharge roller 111.

Figure 2:
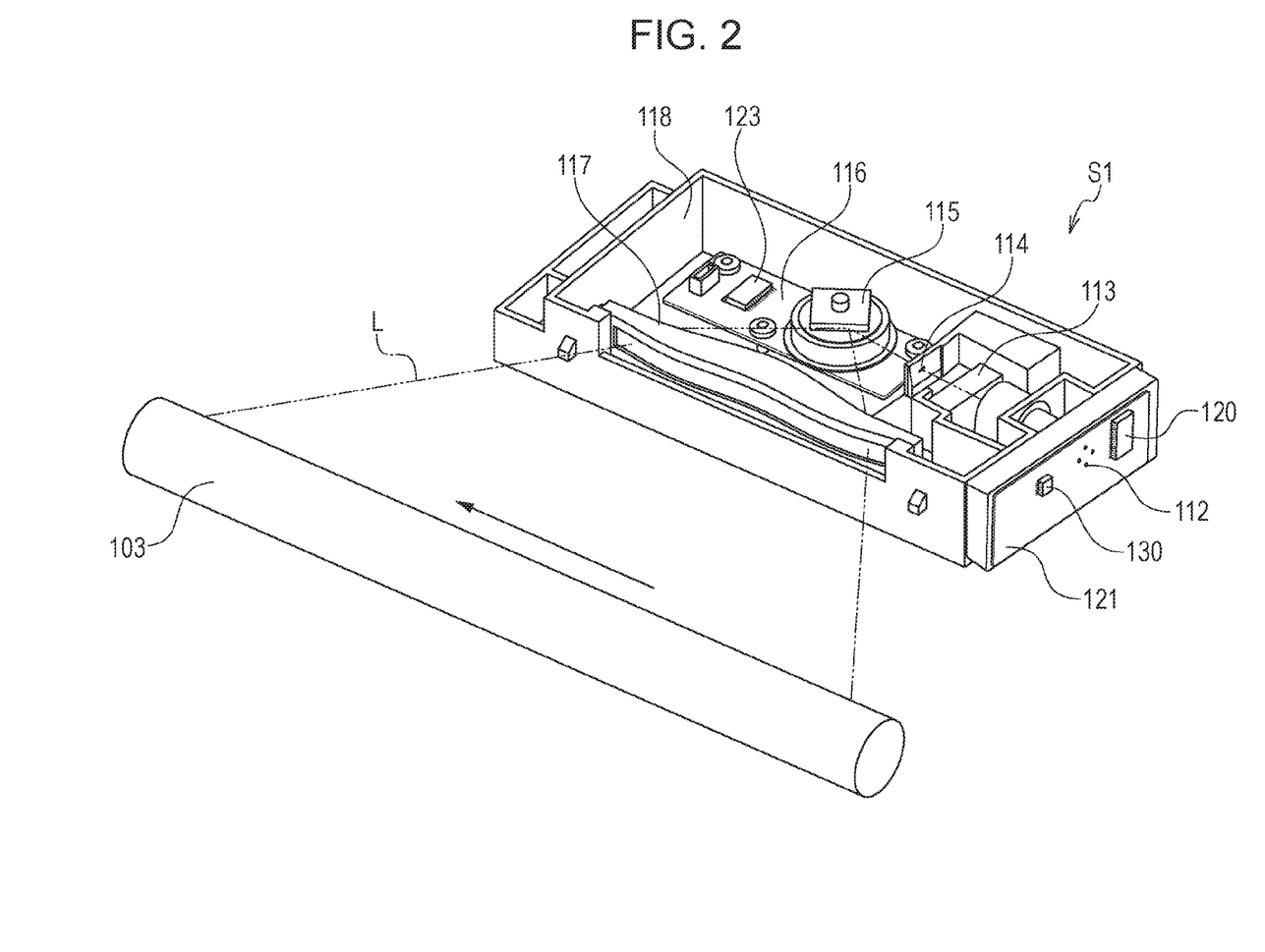
FIG. 2 is a perspective view of an optical scanning device according to a first exemplary embodiment (without a lid).

Next, the optical scanning device S1 will be described with reference to FIG. 2 and FIG. 3. FIG. 2 is a perspective view illustrating a configuration of the optical scanning device S1. For the purpose of description, FIG. 2 illustrates a state in which a lid 119 is not attached.

The optical scanning device S1 includes a semiconductor laser (laser light source) 112 and a first substrate 121 provided with a driver IC (electronic component) 120 for driving the laser light source. The optical scanning device S1 further includes an optical deflector (rotatable polygon mirror) 115 that deflects and scans a light beam emitted by the laser light source and a second substrate 116 provided with a driver IC (electronic component) 123 for driving the optical deflector. A case 118 is made of resin and houses the optical deflector, and a lid 119 is made of resin and covers an opening of the case 118.

FIG. 2 illustrates an anamorphic collimator lens 113 obtained by integrally forming a collimator lens and a cylindrical lens. FIG. 2 also illustrates an aperture stop 114, an fθ lens (scan lens) 117, and a BD sensor 130. The BD sensor 130 is mounted on the first substrate 121.

In the configuration described above, a laser beam L emitted by the light source 112 is turned into a laser beam that is substantially converged within a main scanning section and that is converged within a sub-scanning section by the anamorphic collimator lens 113. Then, the laser beam L passes through the aperture stop 114 and has its beam width regulated, and the laser beam L is imaged on a reflection surface of the rotatable polygon mirror 115 substantially as a line image (a line image with its longitudinal direction extending in the main scanning direction). Thereafter, the laser beam L is deflected and scanned as the rotatable polygon mirror 115 is rotated. The laser beam L is reflected by a reflection surface of the rotatable polygon mirror 115 and is incident on the BD sensor 130. At this point, the BD sensor 130 detects a signal, and this timing serves as a synchronization detection timing of a write-start position in the main scanning direction. Then, the laser beam L is incident on the fθ lens 117. The fθ lens 117 is designed such that the laser beam L is condensed thereby so as to form a spot on the photosensitive drum 103 and the scanning speed of the spot is kept uniform. The fθ lens 117 is formed into an aspherical lens in order to obtain the aforementioned characteristics of the fθ lens 117. The laser beam L that has passed through the fθ lens 117 is imaged on the photosensitive drum 103.

The laser beam L is deflected and scanned by rotating the rotatable polygon mirror 115, and a main scan is carried out on the photosensitive drum 103 by the laser beam L. Meanwhile, a sub scan is carried out by rotationally driving the photosensitive drum 103 about an axial line of its cylinder. In this manner, an electrostatic latent image corresponding to image information is formed on the surface of the photosensitive drum 103.

Figure 3:
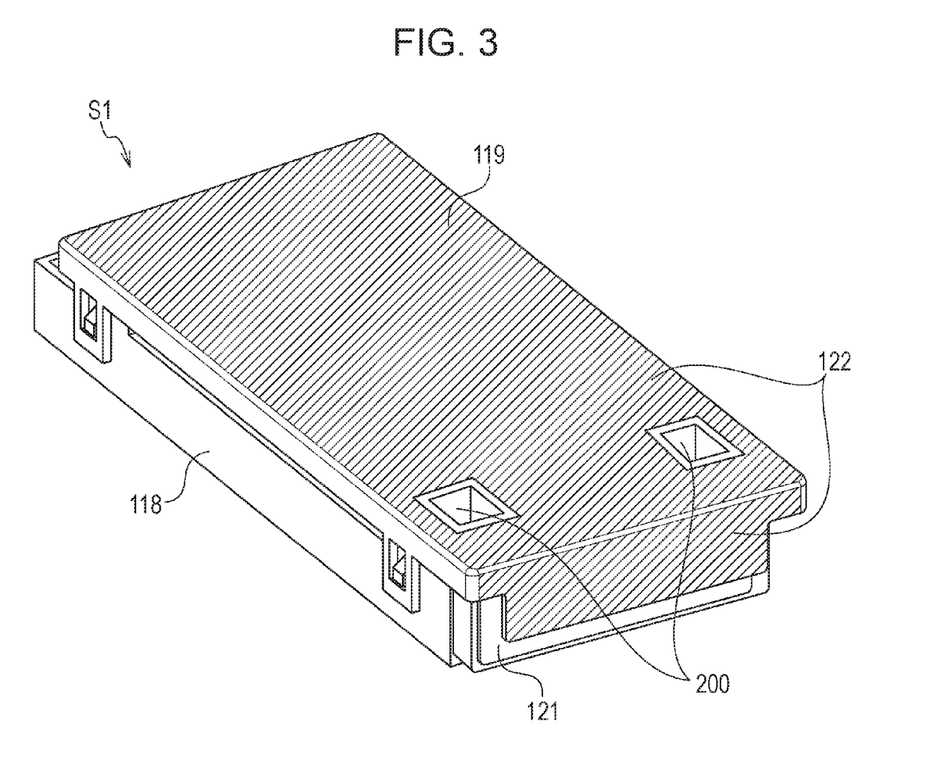
FIG. 3 is a perspective view of the optical scanning device according to the first exemplary embodiment (with a lid).

FIG. 3 is a perspective view of the optical scanning device S1. FIG. 3 illustrates a state in which the lid 119 formed of resin is attached to the optical scanning device illustrated in FIG. 2. The lid 119 and the case 118 engage with each other through a snap-fit. Alternatively, the lid 119 and the case 118 may be fixed to each other by a screw. As the lid 119 is attached, the optical scanning device S1 is substantially sealed. FIG. 3 illustrates a recess 200 having a screw hole provided in its base. The lid 119 has such a shape that covers the light source 112, the driver IC 120, and other electronic components mounted on the first substrate 121 so as to protect these electronic components.

Figure 4:
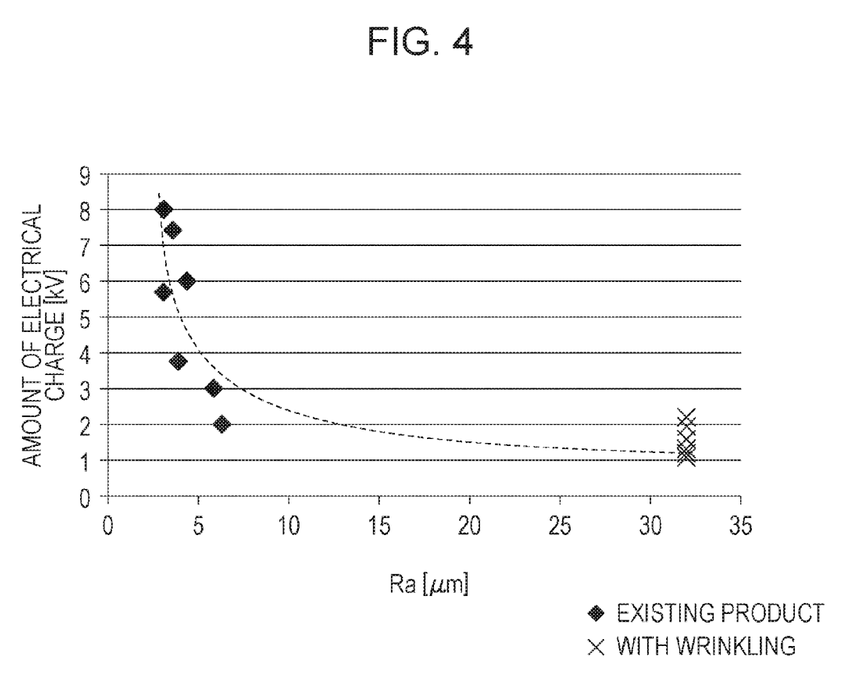
FIG. 4 is a graph illustrating a relation between the surface roughness and the amount of electrical charge.
Figure 6:
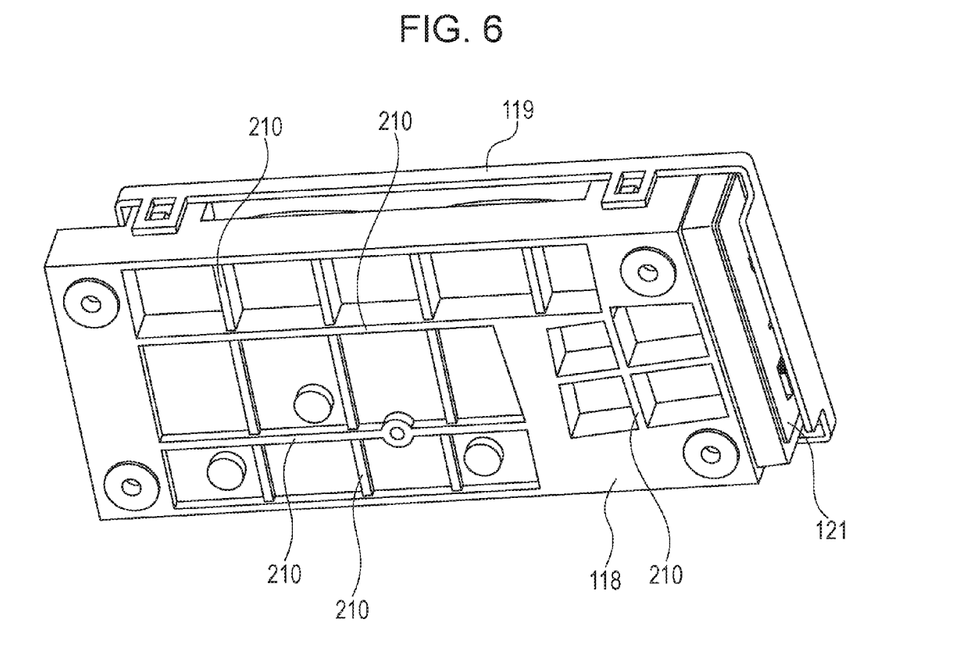
FIG. 6 is a perspective view illustrating a base surface of an optical case.

Some features of the present exemplary embodiment will now be described. At least a partial region 122 of an outer planar surface of at least one of the case 118 and the lid 119 is roughened. In the present example, the region 122 of the lid 119 is roughened through a wrinkling process. The roughened region 122 of the present example is provided on, of the outer planar surface of the lid 119, a surface that is parallel to the first substrate 121 and a surface that is parallel to the second substrate 116. In particular, it is preferable that the roughened region be provided over the driver IC 123 on the second substrate 116 and in the vicinity of the laser driver IC 120. The wrinkling process may be performed through such processing methods as etching, sandblast, and hairline finishing. Through an investigation, the present inventors have found that there is a correlation between the surface roughness of a resin member and the amount of electrical charge of that member, as illustrated in FIG. 4. In FIG. 4, the horizontal axis represents an arithmetic mean roughness Ra [μm], and the vertical axis represents the amount of electrical charge [kV] arising when the surface of the lid 119 is rubbed with a conductive vinyl. It can be seen that, as the roughness Ra is large, or in other words, as the surface is more roughened, the amount of electrical charge arising when being rubbed with another member is smaller. In this manner, as a portion or the entirety of the outer surface of the case 118 or the lid 119 is roughened, electrification that occurs while the optical scanning device is transported or assembled can be reduced, and damage to the electronic components caused by an electrical discharge can be suppressed as a result. The roughened region 122 most effectively functions when the roughened region 122 is provided over the driver IC 123 and also in the vicinity of the laser driver IC 120. As illustrated in FIG. 3, it is particularly preferable that the roughened region 122 be provided on a substantially entire portion of the planar portion of the lid 119. It is to be noted that a number of ribs 210 are provided on the base surface of the case 118 of the present example, as illustrated in FIG. 6. Therefore, it is less likely that an individual packaging bag or an assembly operator comes into contact with the planar portion of the base surface, and the planar portion is less likely to become charged. Thus, no roughened region is provided on the planar portion of the base surface. In the present example, no roughened region is provided on a side surface of the case 118, either. However, a roughened region may also be provided on the planar portion of the base surface or on the planar portion of the side surface of the case 118.

It is desirable that the magnitude of the roughness Ra (JIS B0601) be no less than 6 μm. However, if a honing process or the like is performed, a shear drop in an etched portion or a formation-related problem may occur, and thus the roughness Ra needs to be no greater than 40 μm. Accordingly, it is desirable that the roughness Ra be in a range of 6 μm≤Ra≤40 μm.

In the present exemplary embodiment, an example that employs a wrinkling process has been illustrated. However, it is sufficient that the region 122 be roughened through at least one of a wrinkling process, a dimpling process, and an embossing process. In other words, it is sufficient that a surface shape that can reduce the contact area with another member be employed. In addition, the roughened region 122 may be provided on, of the outer planar surface, at least one of the surface that is parallel to the first substrate 121 and the surface that is parallel to the second substrate 116, as necessary.

Second Exemplary Embodiment

Figure 5:
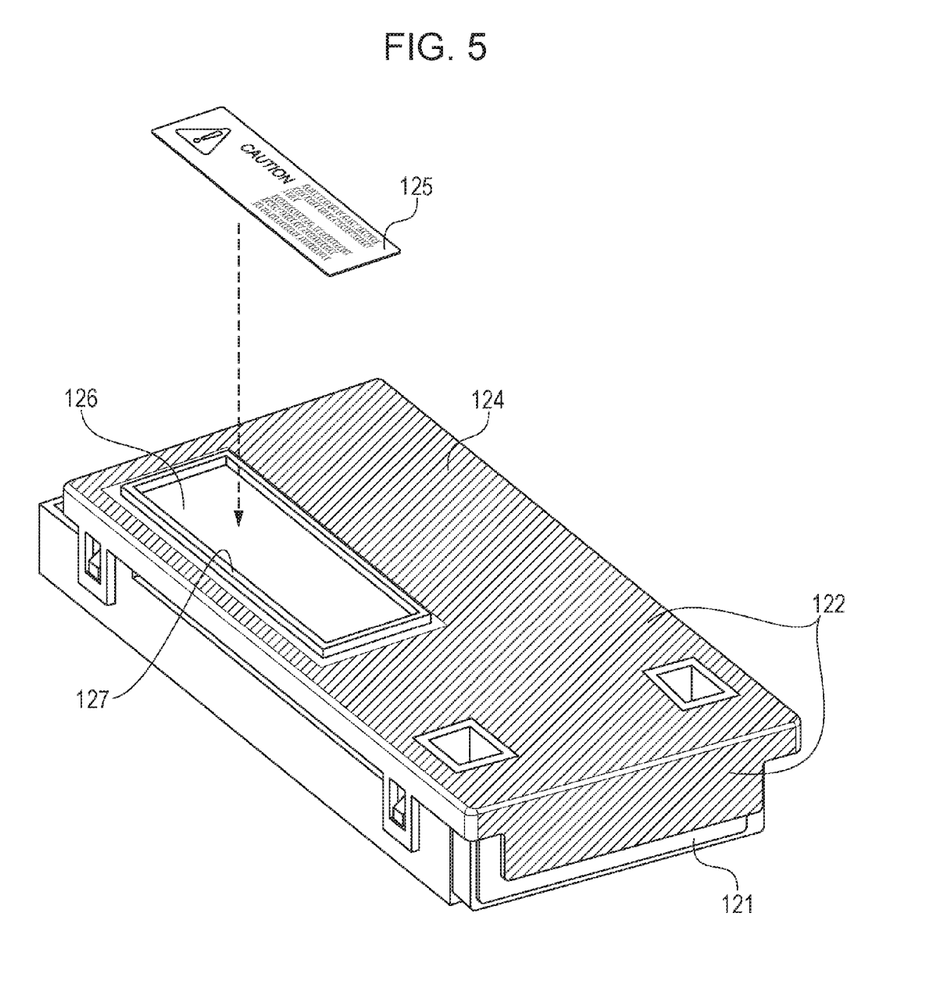
FIG. 5 is a perspective view of an optical scanning device according to a second exemplary embodiment.

FIG. 5 illustrates an optical scanning device according to a second exemplary embodiment. A lid 124 of the present example includes a planar portion 126 that is not roughened (i.e., the arithmetic mean roughness Ra is less than 6 μm) present in the roughened region 122. A product that includes a laser, such as the optical scanning device, is required by a standard to have a warning display displaying a danger symbol and the classification. Typically, this display is affixed on the outside of the optical scanning device in the form of a label 125 having a noticeable color so that a user or an assembly operator can easily recognize the display. However, if the entire outer surface of the case or the lid 124 is roughened, the contact area between a label affixing surface and the label is reduced, which leads to a problem in that the label is likely to come off. Therefore, in the present example, the planar portion 126 that serves as the label affixing surface is not roughened. However, since at least a portion of the label affixing surface 126 is not roughened, when an individual packaging bag or an operator comes into contact with the affixing surface 126, the affixing surface is likely to become charged. In order to solve this problem, a rib 127 is provided along the outer periphery of the affixing surface, and thus the affixing surface 126 is prevented from coming into direct contact with an individual packaging bag or an assembly operator. Alternatively, instead of providing a rib, the level of the affixing surface 126 may be made lower than the level of the surrounding surface. In addition, it is desirable that the planar portion 126 serving as the label affixing surface be disposed so as to avoid a portion directly above the second substrate 116. In this manner, it is preferable that a projection be provided so as to surround the affixing portion 126 or that a step that makes the level of the affixing portion lower than the level of the surrounding portion be provided. It is to be noted that the label is not limited to a laser warning label and the label may also be a bar code label for production management.

With the configuration described above, electrification of the case or the lid can be suppressed while securing a label affixing portion for a laser warning label or a bar code label.

Third Exemplary Embodiment

Figure 7:
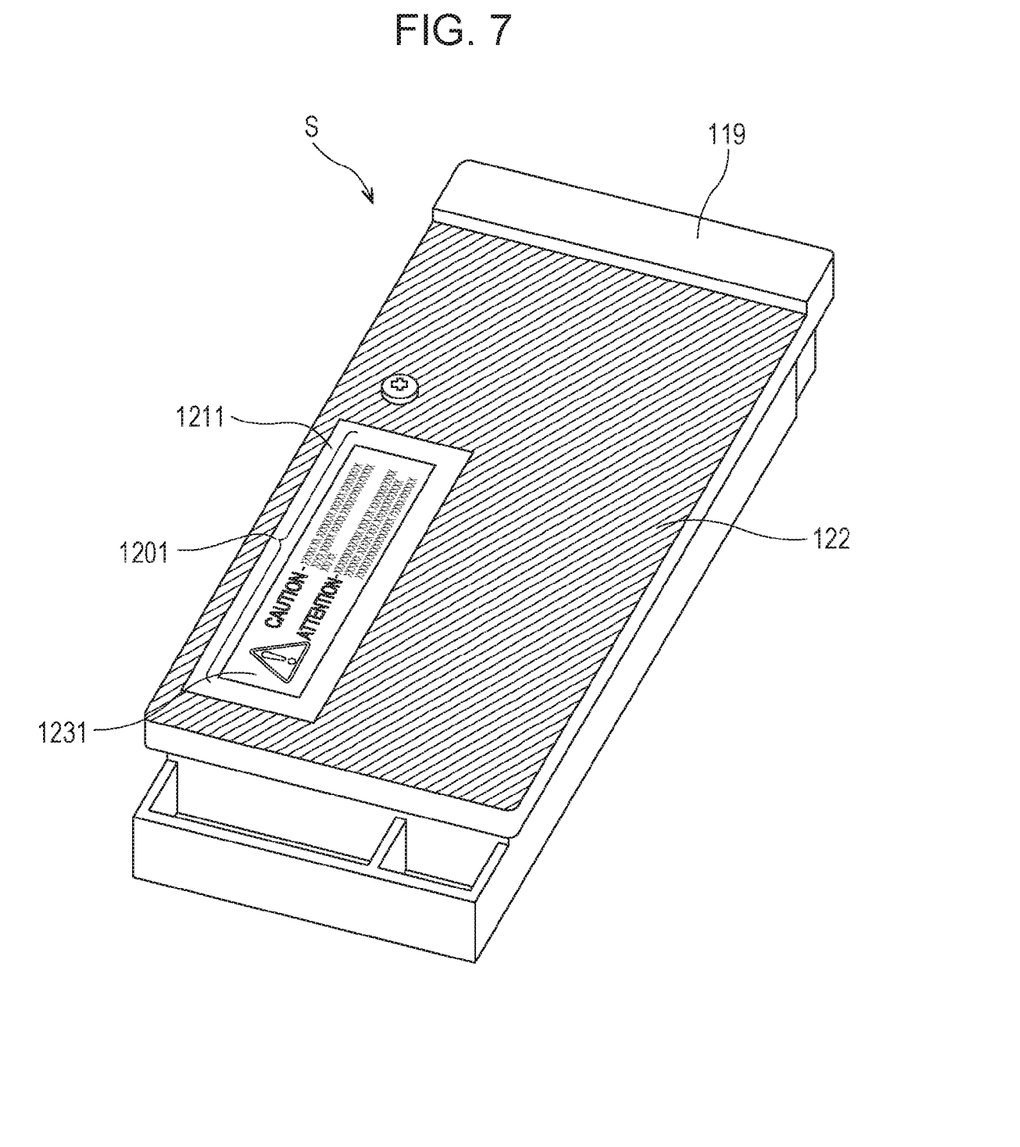
FIG. 7 is a perspective view of an optical scanning device according to a third exemplary embodiment.

Next, the details of the lid 119 having a characteristic configuration according to the present exemplary embodiment will be described. FIG. 7 is a perspective view of an optical scanning device S with the lid 119 attached thereto. In the present exemplary embodiment, the lid 119 is made of resin.

The surface of the lid 119 includes a first rough surface region 122 (portion indicated by hatching) in which the surface is roughened. As the surface is roughened, the area on the surface that comes into contact with another member or an assembly operator while the optical scanning device S is transported or assembled is reduced, and thus electrification of the lid 119 is reduced.

In the present exemplary embodiment, the rough surface region 122 covers the upper portion of the optical deflector 115. As described above, electronic components, such as an IC chip, can be damaged by the ESD, and thus covering the upper surface of the optical deflector 115 provided with an IC is effective. In the present exemplary embodiment, the entire region corresponding to the upper surface of the optical deflector 115 is roughened. The present exemplary embodiment, however, is not limited thereto, and only a portion of the upper surface of the optical deflector 115 may be roughened because the advantageous effect can be obtained as long as electrification in the vicinity of the optical deflector is reduced. In other words, it is sufficient that the rough surface region 122 be provided on at least a portion of the surface region of the lid 119 as seen by projecting the optical deflector 115 onto the lid 119.

With regard to the roughness of the rough surface region 122, it is desirable that the arithmetic mean roughness (JIS B0601) Ra be no less than 6 μm. However, if a honing process or the like is performed, a rough surface region 122 that is too rough leads to a deterioration in the flowability or an increase in the mold release resistance, and a formation-related problem may occur. Thus, the roughness Ra is desirably no greater than 40 μm. Accordingly, it is desirable that the roughness Ra be in a range of 6 μm≤Ra≤40 μm.

The rough surface region 122 is roughened through a wrinkling process. The wrinkling process may be performed on the mold for forming the lid 119 through such process methods as etching, sandblast, or hairline finishing. In addition, aside from the wrinkling process, the mold may be roughened through at least one of a dimpling process and an embossing process.

In addition, as described above, since the optical scanning device S includes a laser, a predetermined symbol and classification (hereinafter, referred to as a laser warning) needs to be displayed as information related to the laser safety in accordance with the safety standard (e.g., IEC 60825-1) pertaining to lasers. Therefore, a marking 1201 that is integrally formed with the lid is provided in the lid 119 to serve as a display portion that displays a laser warning in a language of the country or the region where the optical scanning device S is sold.

In addition, a smooth region 1211 in which the surface is not roughened is provided between the marking 1201 and the rough surface region 122. It is desirable that the surface roughness of the smooth region 1211 be less (smoother) than the surface roughness of the rough surface region 122. In order to reduce the surface roughness of the smooth region 1211, mirror finishing may be performed on the mold.

Figure 8:
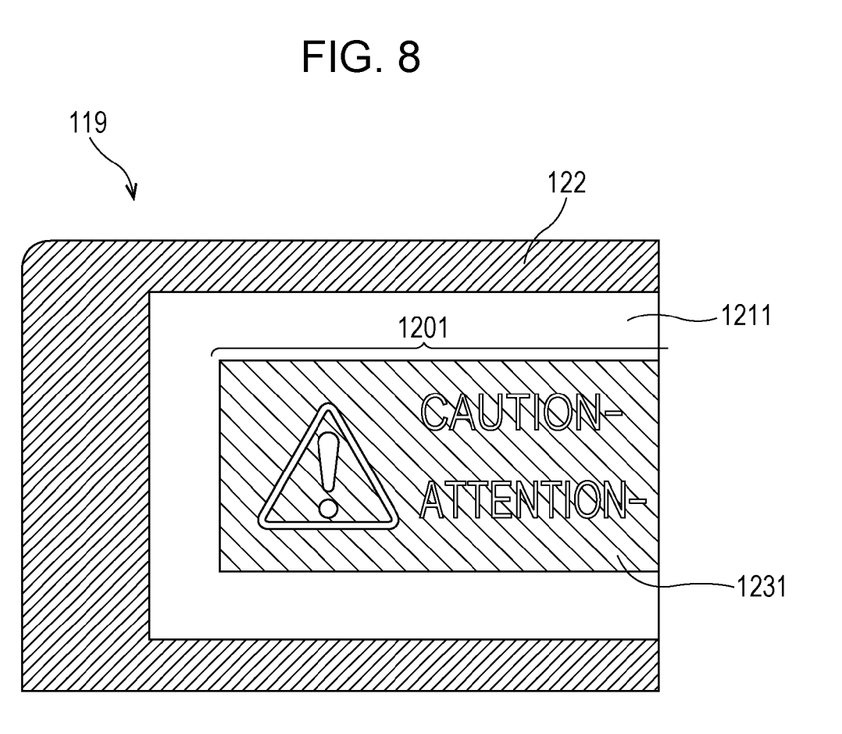
FIG. 8 is an enlarged view of a marking portion on a lid according to the third exemplary embodiment.

FIG. 8 is an enlarged view of the marking 1201 and the vicinity thereof. The marking (display portion) 1201 includes a letter and symbol portion and a background portion 1231. The background portion 1231 excluding the letter and symbol portion is roughened through a wrinkling process (second rough surface region). With this configuration, the contrast between the letter and symbol portion and the background portion 1231 is made clear, which makes it easier to see the display contrast. For simplifying the description, the background portion 1231 is hatched in FIG. 8. It is desirable that the roughness Ra of the second rough surface region be in a range of 1 μm≤Ra≤6 μm.

Although an example that employs a wrinkling process has been illustrated, it is sufficient that the surface roughness of the letter and symbol portion and the surface roughness of the background portion be made to differ from each other by roughening the background portion 1231. Thus, as in the rough surface region 122, the background portion 1231 may be roughened through at least one of a wrinkling process, a dimpling process, and an embossing process.

An advantageous effect of the smooth region 1211 will now be described. The surface of the rough surface region 122 and the surface of the background portion 1231 in the marking 1201 are both roughened through a wrinkling process or the like. Therefore, when the marking 1201 and the rough surface region 122 are disposed continuously, the boundary between the marking 1201 and the rough surface region 122 is hard to recognize, and the visual recognizability of the marking 1201 decreases. In contrast, the presence of the smooth region 1211 as illustrated in FIG. 8 makes the boundary between the marking 1201 and the rough surface region 122 clear. With this configuration, the marking 1201 is emphasized even when the marking 1201 is surrounded by the rough surface region, and the marking 1201 can be visually recognized with ease.

In addition, although both the rough surface region 122 and the background portion 1231 in the marking 1201 are roughened, the surface roughness of the rough surface region 122 and that of the background portion 1231 may be made to differ from each other within a range of desired surface roughness. Thus, the visual recognizability increases.

Figure 9:
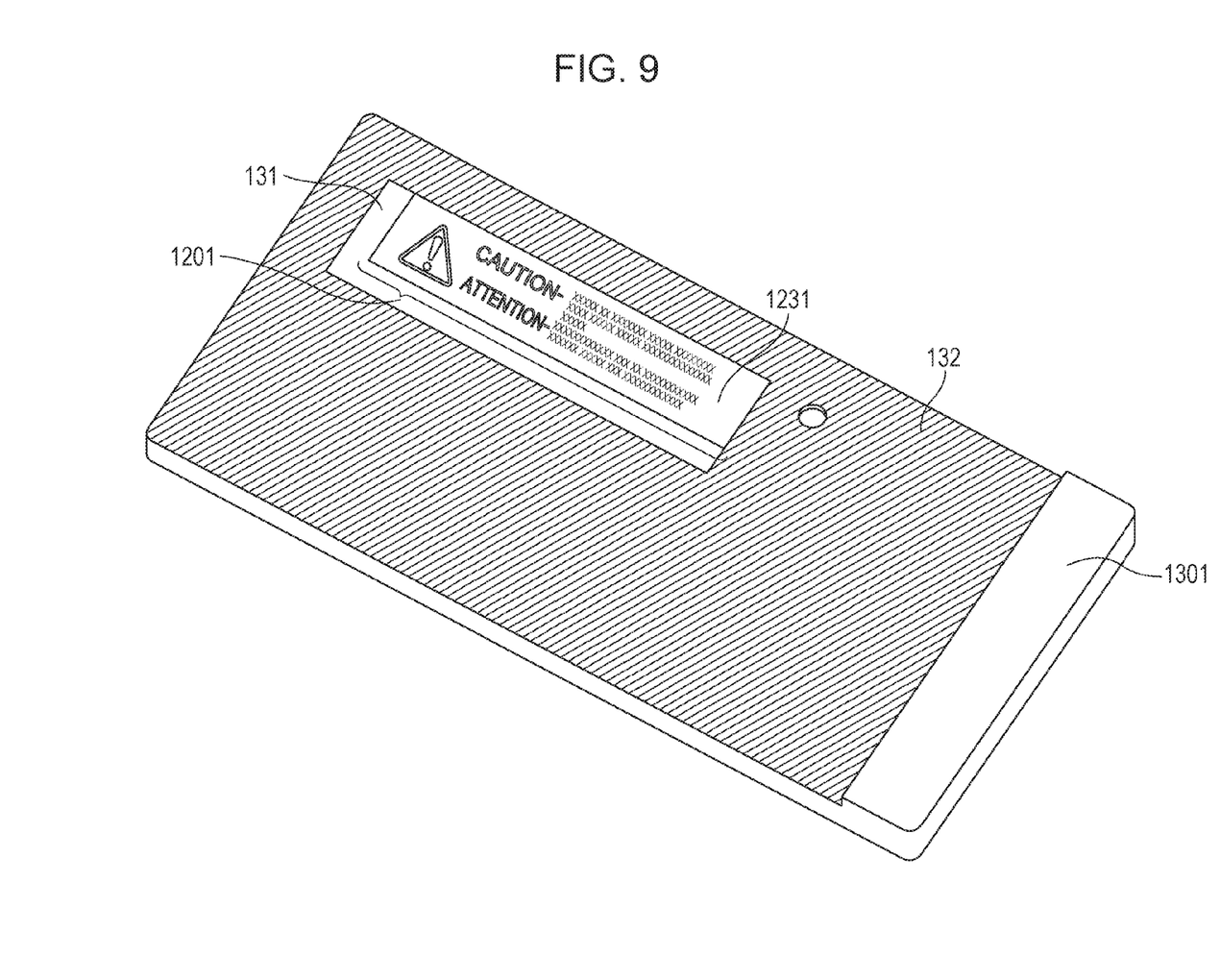
FIG. 9 illustrates a modification of the lid according to the third exemplary embodiment.

Although the smooth region is disposed along the entire periphery of the marking 1201 in the present exemplary embodiment, the present exemplary embodiment is not limited thereto. When it is difficult to dispose the smooth region along the entire periphery of the marking 1201, a configuration of a lid 1301 illustrated in FIG. 9 may be employed. Specifically, a portion of the periphery of the marking 1201 is in contact with a rough surface region 132, but the remaining portion of the periphery of the marking 1201 is in contact with a smooth region 131. In this manner, a configuration in which the smooth region 131 is provided only along a portion of the periphery of the marking 1201 also provides an advantageous effect of making the marking 1201 more visually recognizable.

As described thus far, the surface of the lid includes a display portion (marking) that displays information related to a light beam (laser beam), a first rough surface region provided around the display portion, and a smooth region provided between the display portion and the first rough surface region that are integrally formed with the lid. Furthermore, a letter and symbol portion that indicates the information related to the light beam and a second rough surface region are provided in the display portion. With this configuration, the visual recognizability of the marking improves, and the risk of an electronic component being damaged by an electrostatic discharge can be reduced.

Fourth Exemplary Embodiment

Figure 10:
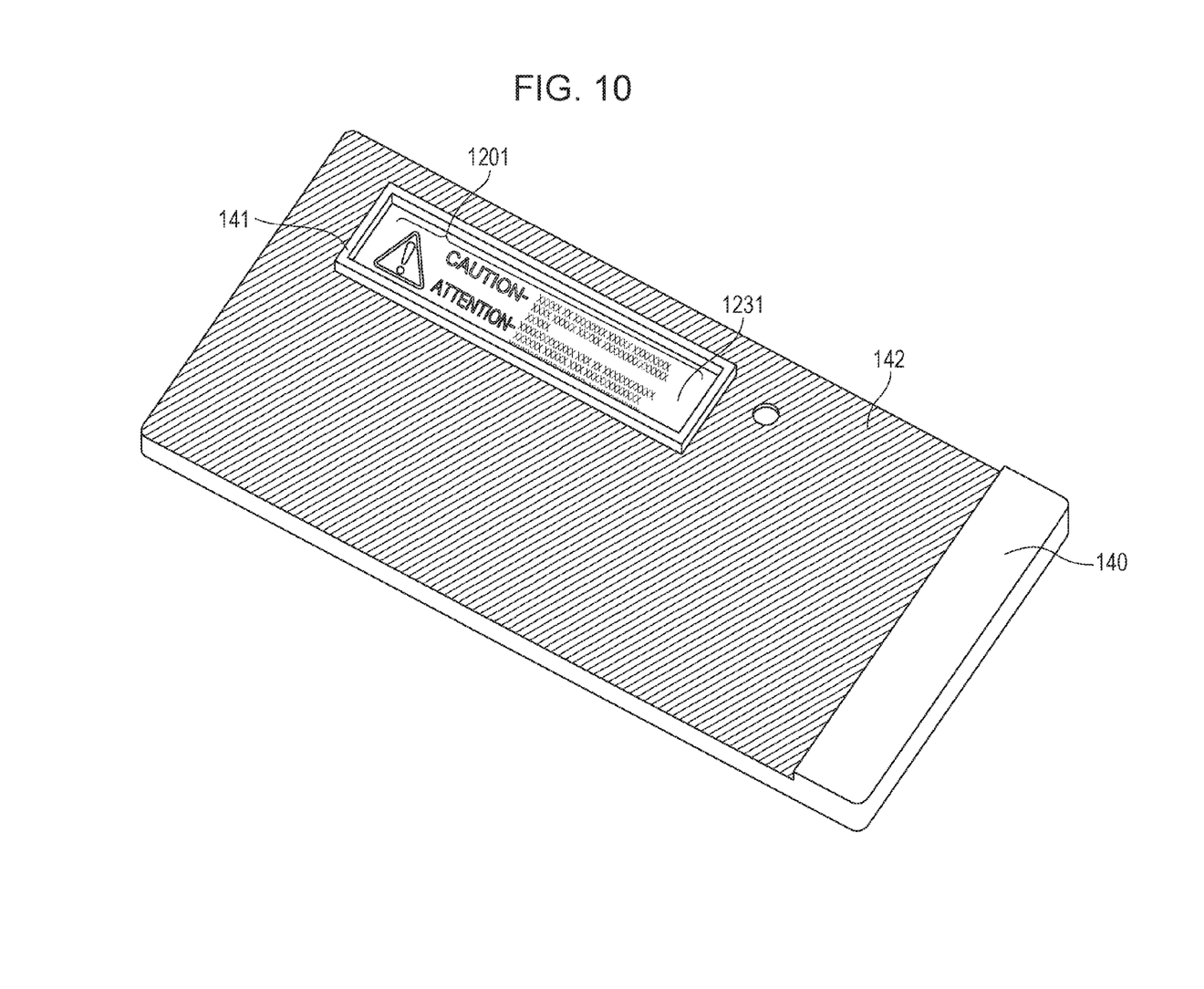
FIG. 10 illustrates a lid according to a fourth exemplary embodiment.

A fourth exemplary embodiment will now be described. FIG. 10 illustrates a perspective view of a lid 140 according to the present exemplary embodiment. The lid 140 includes a rib 141 provided between a first rough surface region 142 (hatched portion) that is roughened in order to reduce electrification and the marking 1201 that displays a laser warning. The rib 141 is disposed. In other words, the marking 1201 is made to be visually recognized with ease by providing a region (rib) that differs in height from the marking 1201 and the rough surface region 142.

Figure 11:
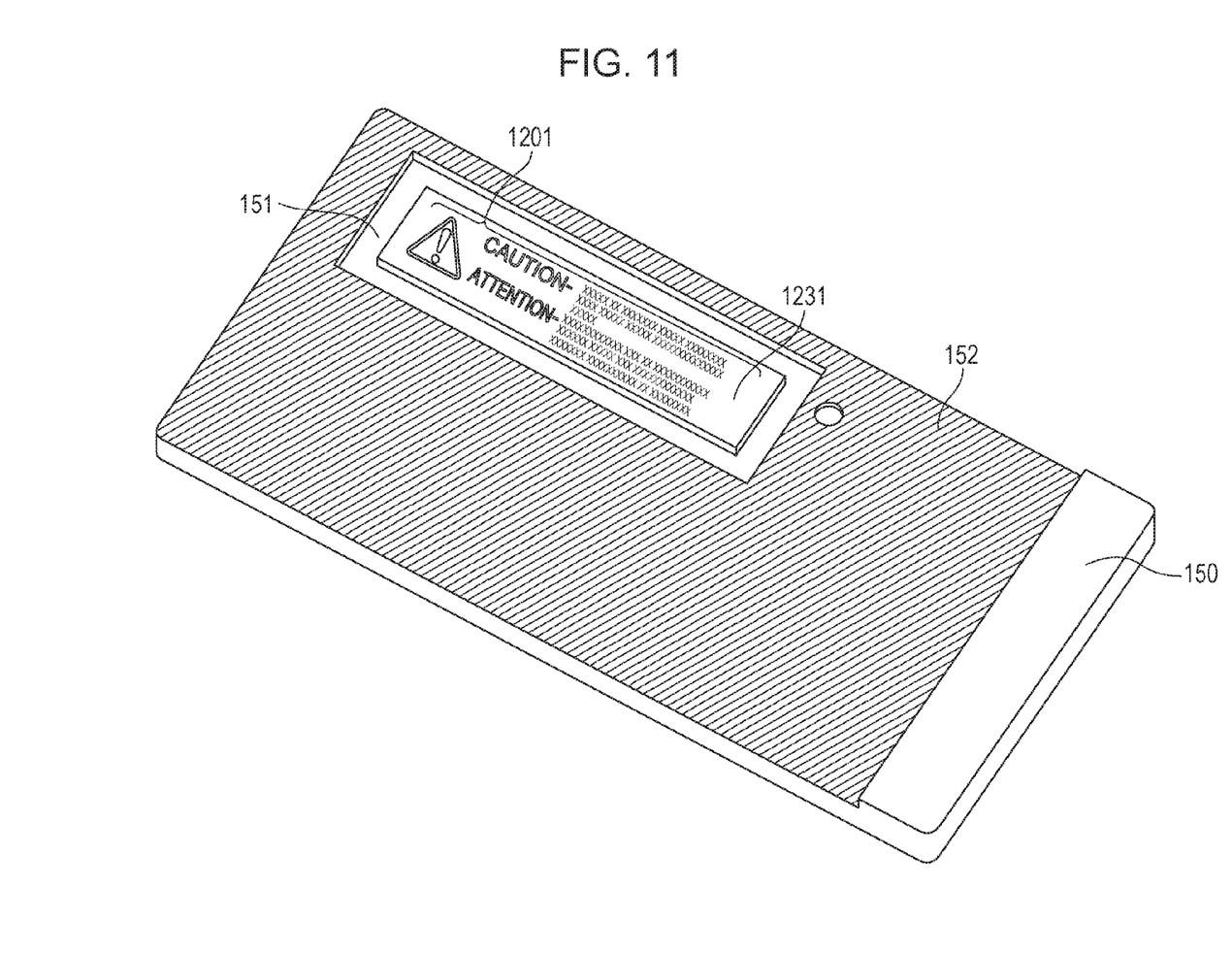
FIG. 11 illustrates a modification of the lid according to the fourth exemplary embodiment.
Figure 12:
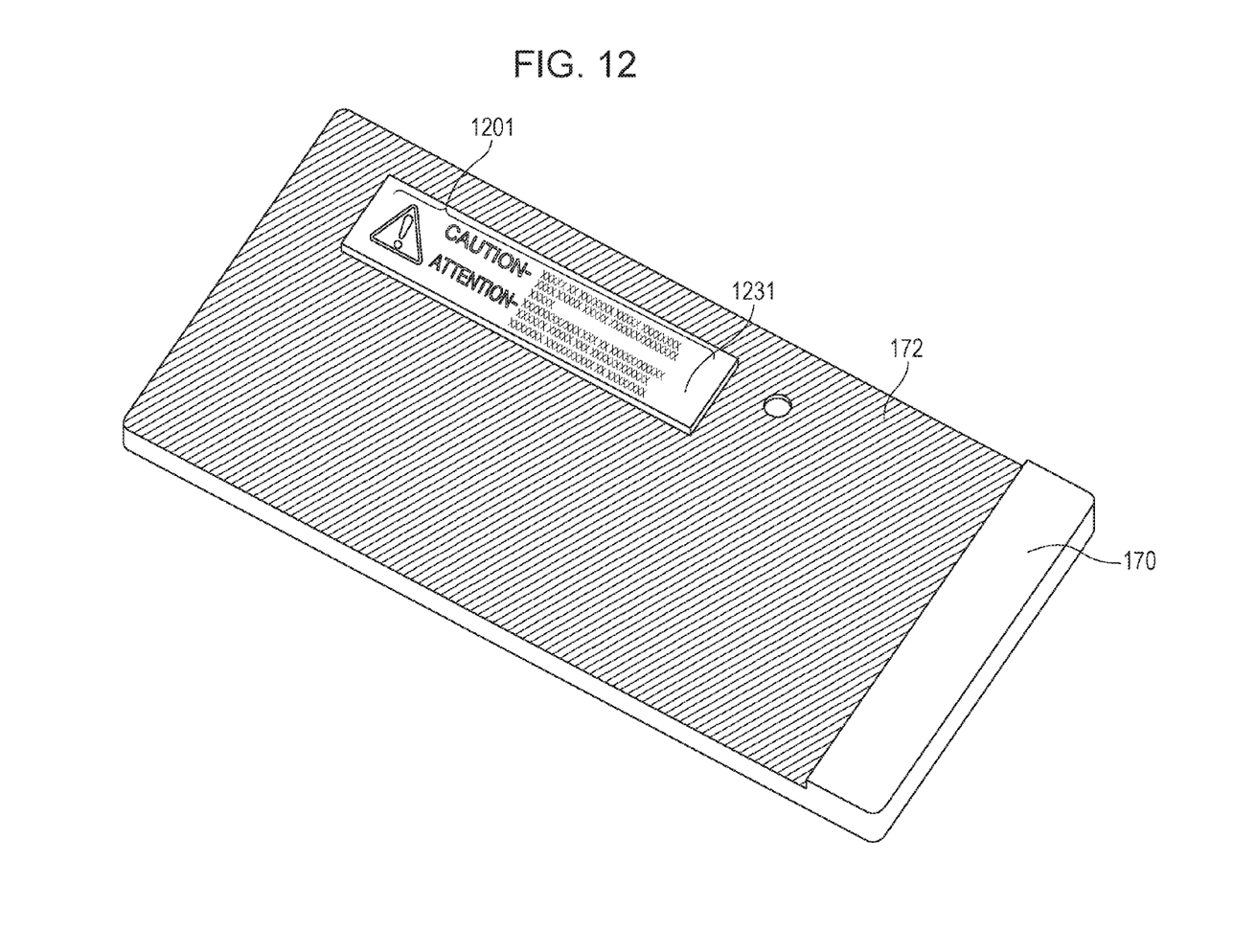
FIG. 12 illustrates another modification of the lid according to the fourth exemplary embodiment.

Although the rib is disposed around the marking 1201 in FIG. 10, it is sufficient that there be a portion between the marking and the rough surface region that differs in height therefrom, and thus a groove 151 may instead be provided between the marking 1201 and a rough surface region 152 as in a lid 150 illustrated in FIG. 11. Alternatively, as in a lid 170 illustrated in FIG. 12, the entirety of the marking 1201 and the surface of a rough surface region 172 may be made to differ in height from each other, and a similar effect can also be obtained. In other words, the marking (display portion) 1201 and the first rough surface region 172 may differ in height from each other. The lid illustrated in FIG. 12 is an example in which the level of the marking 1201 is higher than that of the rough surface region 172.

In addition, as in the third exemplary embodiment, only a portion of the periphery of the marking 1201 may be made to differ in height from the surrounding.

Figure 13:
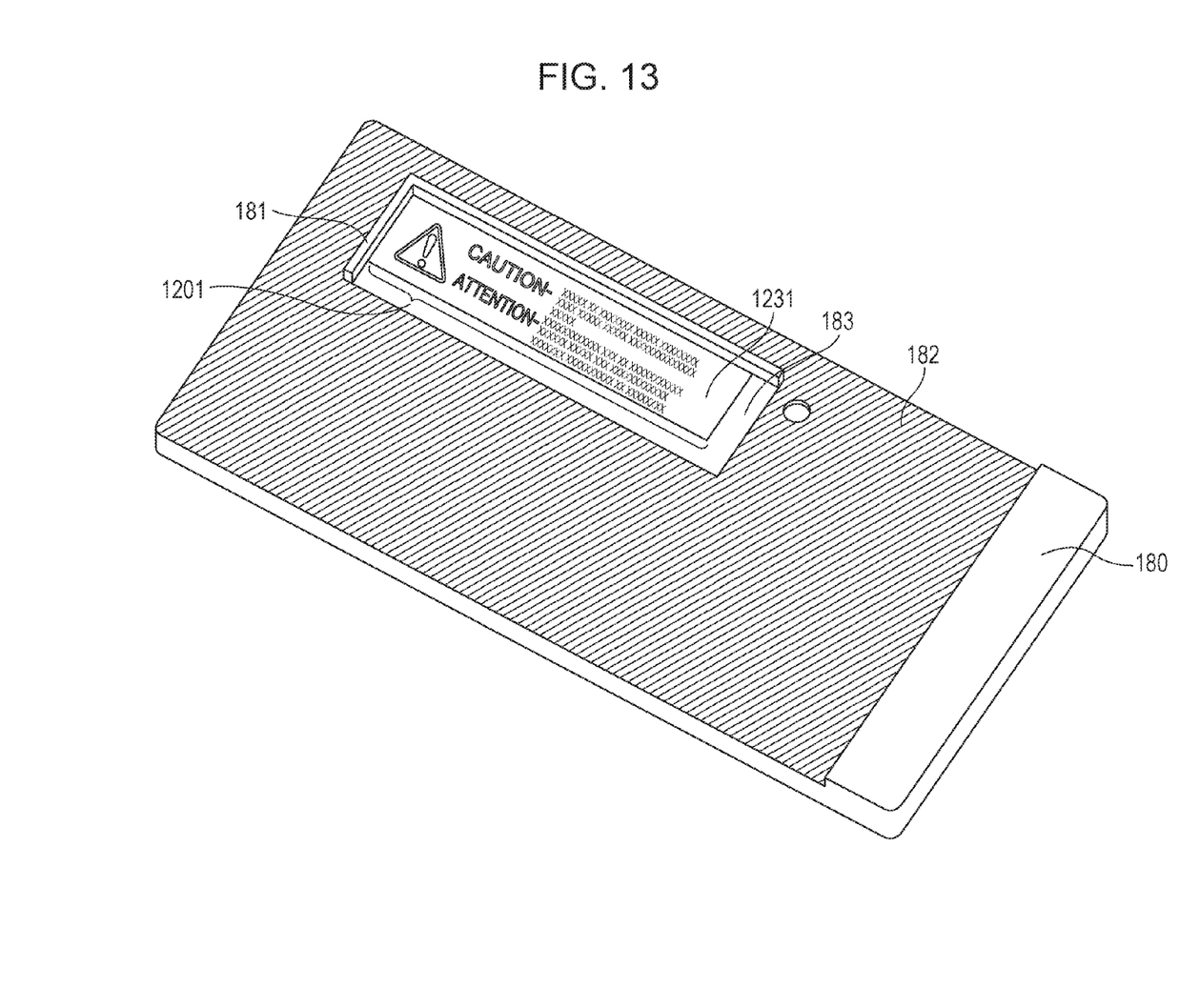
FIG. 13 illustrates another modification of the lid according to the fourth exemplary embodiment.

In addition, as in a lid 180 illustrated in FIG. 13, both a region 181 that differs in height from a rough surface region 182 or the marking 1201 and a smooth region 183 that is not roughened may be disposed around the marking 1201.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121297 filed Jun. 16, 2015 and Japanese Patent Application No. 2016-097161 files May 13, 2016, which are hereby incorporated by reference herein in their entirety.

What is claimed is:

1. An optical scanning device, comprising:
a laser light source;
a first substrate provided with an electronic component for driving the laser light source;
an optical deflector configured to deflect and scan a light beam emitted by the laser light source;
a second substrate provided with an electronic component for driving the optical deflector;
a case made of resin and configured to house the optical deflector; and
a lid made of resin and configured to cover an opening of the case,
wherein at least a partial region of an outer planar surface of at least one of the case and the lid is roughened,
wherein a label is affixed to an outer planar surface of one of the case and the lid, and
wherein an affixing surface for the label is not roughened.

2. The optical scanning device according to claim 1,
wherein the region is roughened through at least one of a wrinkling process, a dimpling process, and an embossing process.

3. The optical scanning device according to claim 1,
wherein the region that is roughened is provided on, of the outer planar surfaces, at least one of a surface that is parallel to the first substrate and a surface that is parallel to the second substrate.

4. The optical scanning device according to claim 1,
wherein an affixing portion on which the label is affixed is surrounded by one of a projection and a step that makes a level of the affixing portion lower than a level of a portion surrounding the affixing portion.

5. The optical scanning device according to claim 1,
wherein the label is a label that warns of the light beam.

6. An optical scanning device, comprising:
a laser light source;
an optical deflector configured to deflect and scan a light beam emitted by the laser light source;
a case made of resin and configured to house the optical deflector; and
a lid made of resin and configured to cover an opening of the case,
wherein a display portion configured to display information related to the light beam, a first rough surface region provided around the display portion, and a smooth region provided between the display portion and the first rough surface region are provided on a surface of the lid, the display portion, the first rough surface region, and the smooth region being formed integrally with the lid, and
wherein a letter and a symbol indicating the information related to the light beam and a second rough surface region are provided in the display portion.

7. The optical scanning device according to claim 6,
wherein an arithmetic mean roughness Ra of the first rough surface region satisfies 6 µm≤Ra≤40 µm.

8. The optical scanning device according to claim 6,
wherein the first rough surface region and the second rough surface region are roughened through at least one of a wrinkling process, a dimpling process, and an embossing process.

9. The optical scanning device according to claim 6,
wherein the first rough surface region is provided on at least a portion of a surface region of the lid as seen by projecting the optical deflector onto the lid.

10. An optical scanning device, comprising:
a laser light source;
an optical deflector configured to deflect and scan a light beam emitted by the laser light source;
a case made of resin and configured to house the optical deflector; and
a lid made of resin and configured to cover an opening of the case,
wherein a display portion configured to display information related to the light beam, a first rough surface region provided around the display portion, and one of a rib and a groove provided between the display portion and the first rough surface region are provided on a surface of the lid, the display portion, the first rough surface region, and one of the rib and the groove being formed integrally with the lid, and
wherein a letter and a symbol indicating the information related to the light beam and a second rough surface region are provided in the display portion.

11. The optical scanning device according to claim 10,
wherein an arithmetic mean roughness Ra of the first rough surface region satisfies 6 µm≤Ra≤40 µm.

12. The optical scanning device according to claim 10,
wherein the first rough surface region and the second rough surface region are roughened through at least one of a wrinkling process, a dimpling process, and an embossing process.

13. The optical scanning device according to claim 10,
wherein the first rough surface region is provided on at least a portion of a surface region of the lid as seen by projecting the optical deflector onto the lid.

14. An optical scanning device, comprising:
a laser light source;
an optical deflector configured to deflect and scan a light beam emitted by the laser light source;
a case made of resin and configured to house the optical deflector; and
a lid made of resin and configured to cover an opening of the case,
wherein a display portion configured to display information related to the light beam and a first rough surface region provided around the display portion are provided on a surface of the lid, the display portion and the first rough surface region being formed integrally with the lid,
wherein a letter and a symbol indicating the information related to the light beam and a second rough surface region are provided in the display portion, and
wherein the display portion and the first rough surface region differ in height.

15. The optical scanning device according to claim 14, wherein an arithmetic mean roughness Ra of the first rough surface region satisfies 6 μm≤Ra≤40 μm.

16. The optical scanning device according to claim 14, wherein the first rough surface region and the second rough surface region are roughened through at least one of a wrinkling process, a dimpling process, and an embossing process.

17. The optical scanning device according to claim 14, wherein the first rough surface region is provided on at least a portion of a surface region of the lid as seen by projecting the optical deflector onto the lid.

18. An optical scanning device, comprising:
a laser light source;
a first substrate provided with an electronic component for driving the laser light source;
an optical deflector configured to deflect and scan a light beam emitted by the laser light source;
a second substrate provided with an electronic component for driving the optical deflector;
a case made of resin and configured to house the optical deflector; and
a lid made of resin and configured to cover an opening of the case,
wherein at least a partial region of an outer planar surface of at least one of the case and the lid is roughened,
wherein an arithmetic mean roughness Ra of the region satisfies 6 μm≤Ra≤40 μm.

19. The optical scanning device according to claim 18, wherein the region is roughened through at least one of a wrinkling process, a dimpling process, and an embossing process.

20. The optical scanning device according to claim 18, wherein the region that is roughened is provided on, of the outer planar surfaces, at least one of a surface that is parallel to the first substrate and a surface that is parallel to the second substrate.

* * * * *